US011954984B2

(12) United States Patent  
Mande et al.

(10) Patent No.: US 11,954,984 B2
(45) Date of Patent: *Apr. 9, 2024

(54) UNIVERSAL CASSETTE FOR RECIRCULATION OF BILLS IN MULTIPLE SYSTEMS

(71) Applicant: Wells Fargo Bank, N.A., San Francisco, CA (US)

(72) Inventors: Christian Mande, Charlotte, NC (US); Darren Goetz, Salinas, CA (US); Frank Digangi, San Francisco, CA (US); Dennis E Montenegro, Concord, CA (US)

(73) Assignee: Wells Fargo Bank, N.A., San Francisco, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/130,183

(22) Filed: Apr. 3, 2023

(65) Prior Publication Data

US 2023/0237883 A1  Jul. 27, 2023

Related U.S. Application Data

(63) Continuation of application No. 17/205,587, filed on Mar. 18, 2021, now Pat. No. 11,620,878.

(51) Int. Cl.
| G07F 19/00 | (2006.01) |
| G06K 7/10  | (2006.01) |
| G06Q 20/10 | (2012.01) |

(52) U.S. Cl.
CPC ....... *G07F 19/203* (2013.01); *G06K 7/10366* (2013.01); *G06Q 20/1085* (2013.01)

(58) Field of Classification Search
None
See application file for complete search history.

(56) References Cited

U.S. PATENT DOCUMENTS

| 7,559,459 | B2 | 7/2009 | Schmidt et al. |
| 8,052,044 | B2 | 11/2011 | Washington et al. |
| 8,600,842 | B1 | 12/2013 | Sanders et al. |
| 10,475,296 | B1 | 11/2019 | Soprano-Joseph et al. |
| 10,692,320 | B2 | 6/2020 | Yuasa et al. |
| 11,199,853 | B1* | 12/2021 | Afrouzi ............... G05D 1/0246 |
| 11,482,065 | B2* | 10/2022 | Kuroda ............... G07D 11/24 |
| 2015/0302678 | A1* | 10/2015 | Blake ............... G07D 9/06 |
| | | | 453/62 |

(Continued)

OTHER PUBLICATIONS

"Nautilus Hyosung, Operator Manual, NH2600 System, 2013, 47-55" (Year: 2013).*

(Continued)

*Primary Examiner* — Kito R Robinson
*Assistant Examiner* — Toan Duc Bui
(74) *Attorney, Agent, or Firm* — Foley & Lardner LLP

(57) ABSTRACT

A cassette for receiving and dispensing bills is disclosed. The cassette includes a sensor structured to detect a location of the cassette, and memory having stored thereon instructions that, when executed by one or more processors, cause the one or more processors to transmit the location of the cassette to a remote computing device, determine that the location of the cassette has changed, and generate an indication that the location of the cassette has changed.

18 Claims, 7 Drawing Sheets

(56) References Cited

U.S. PATENT DOCUMENTS

2015/0364015 A1* 12/2015 Turocy ................. G07F 19/209
                                                      235/379
2018/0268637 A1*  9/2018 Kurian .................. G07D 11/20
2021/0327224 A1* 10/2021 Steiner .................... A47F 9/048
2021/0366222 A1* 11/2021 Pechinko ................. G07D 7/12
2022/0003588 A1*  1/2022 Volkerink ............... H04Q 9/00
2022/0119460 A1*  4/2022 Verstrepen ........... C12N 15/113

OTHER PUBLICATIONS

"Operator Manual NH2600 System, Nautilus Hyosung, Jun. 25, 2013, Chapter4" (Year: 2013).

* cited by examiner

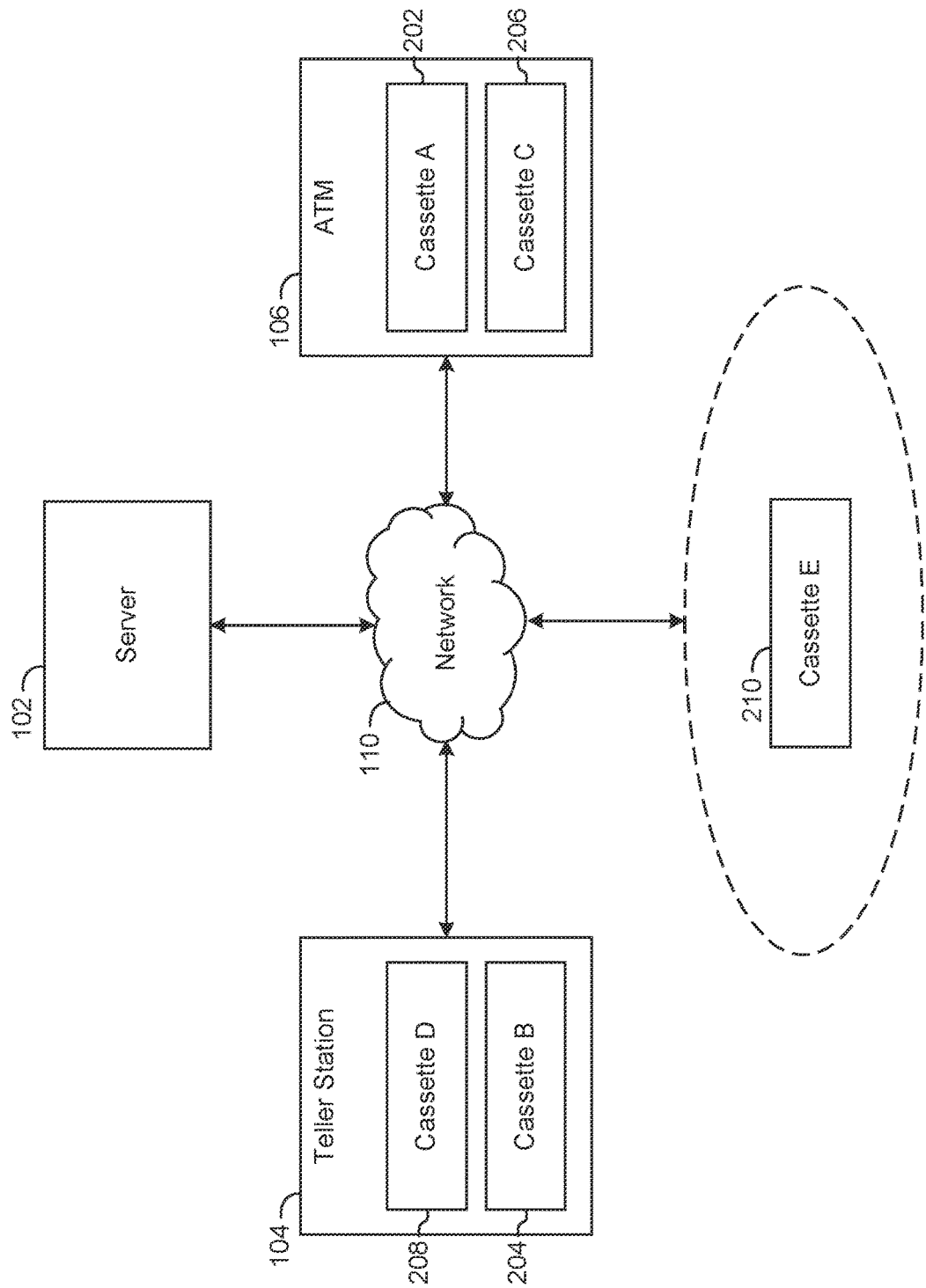

UNIVERSAL CASSETTE FOR RECIRCULATION OF BILLS IN MULTIPLE SYSTEMS

CROSS-REFERENCE TO RELATED PATENT APPLICATIONS

This application is a continuation of U.S. patent application Ser. No. 17/205,587, filed Mar. 18, 2021, the entire disclosure of which is hereby incorporated by reference herein.

BACKGROUND

Bill handling machines, such as automated teller machines (ATMs) or cash recycling units at teller stations (e.g., at a financial institution), often utilize cassettes to store bills (e.g., currency, bank notes, etc.). Each of the series of cassettes can be configured to store a particular denomination or type of bill, and may be structured to receive or dispense bills in response to a transaction. An ATM user may withdraw bills from the ATM by entering account information, a bank card, an amount to withdraw, etc., and the ATM may retrieve appropriate bills from one or more cassettes. A teller operating a teller station may deposit bills into the teller station, and these bills may be routed into appropriate cassettes.

The cassettes utilized by ATMs, teller stations, point-of-sale (POS) systems, etc., may be unique to the particular model or type of device, and therefore may not be compatible with other styles, models, or types of devices. A cassette used in a particular model of ATM may not be compatible with a teller station, or vice versa. Additionally, cassettes may lack smart programmable functionality or features.

SUMMARY

One embodiment of the present disclosure is a cassette for receiving and dispensing bills. The cassette includes a first sensor structured to detect a fill level of the cassette, a second sensor structured to detect a location of the cassette, and memory having stored thereon instructions that, when executed by one or more processors, cause the one or more processors to receive, at one or more time intervals, data from the first sensor indicating the fill level of the cassette, transmit the location of the cassette and an indication of the fill level of the cassette to a remote computing device, and in response to determining that the fill level of the cassette is outside of a threshold value, transmit a notification to the remote computing device.

Another embodiment of the present disclosure is a method that includes receiving, by a first computing device from a first cassette configured to receive and dispense bills, an indication of a fill level of the first cassette and in response to determining that the fill level of the first universal cassette exceeds a threshold limit, determining, by the first computing device, a location of the first cassette, identifying, by the first computing device, a second cassette based on the location of the first cassette, the second cassette being within a predetermined geographical area with respect to the first cassette, and transmitting, by the first computing device and to a second computing device, a notification indicating that the fill level of the first cassette exceeds the threshold limit and identifying the second cassette.

Yet another embodiment of the present disclosure is one or more memory devices having instructions stored thereon that, when executed by one or more processors, cause the one or more processors to perform operations including receiving, from a control circuit of a first universal cassette configured to receive and dispense bills, an indication of a fill level of the first universal cassette and, in response to determining that the fill level of the first universal cassette exceeds a threshold limit, determining a location of the first universal cassette and a denomination of the bills contained within the first universal cassette, identifying, based on the location and the denomination, a second universal cassette for replacing the first universal cassette, the second universal cassette configured to receive and dispense bills of a similar denomination to the first universal cassette, and transmitting, to a remote computing device, a notification indicating that the fill level of the first universal exceeds the threshold limit and identifying the second universal cassette.

BRIEF DESCRIPTION OF THE DRAWINGS

Objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIGS. 2A and 2B are block diagrams illustrating the operation of the cassette management system of FIG. 1, according to some embodiments.

DETAILED DESCRIPTION

Figure 1:
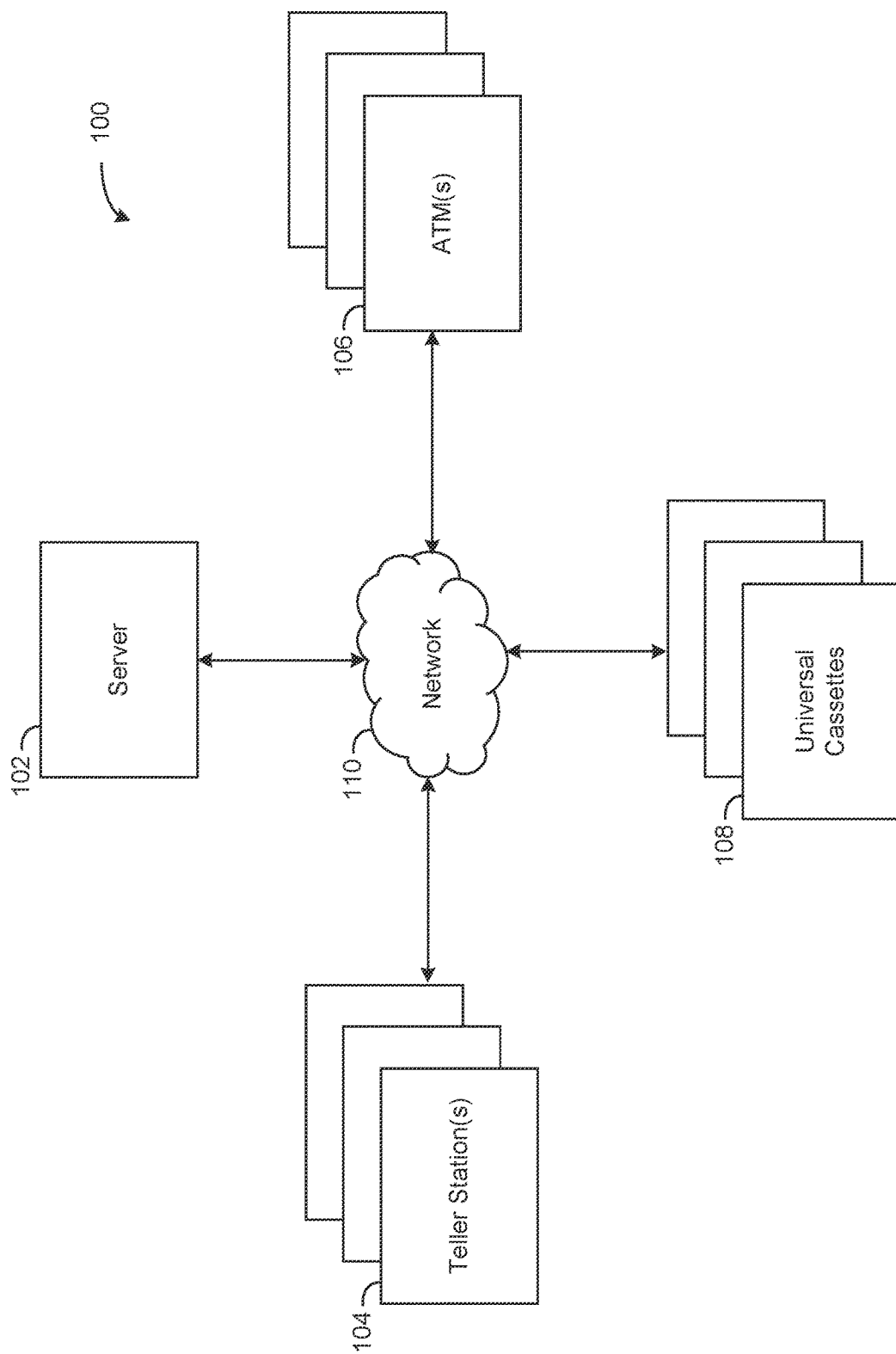
FIG. 1 is a block diagram of a cassette management system, according to some embodiments.

Referring generally to the figures, universal cassettes for receiving and dispensing bills and a cassette management system are shown, according to various embodiments. In particular, the universal cassettes described herein may be docked (i.e., installed, disposed within and/or communicatively coupled to) in various host devices or systems, including various models or types of ATMs, teller stations such as teller counters at banks, cash recyclers, POS systems, etc. In other words, these cassettes are "universal" in that they can be configured to function with a variety of systems. A universal cassette can include a control circuit, which may be embodiment within the cassette in whole or in part (e.g., as an integrated circuit, a system on a chip (SOC), a removable card, etc.). The control circuit can include one or more sensors for detecting bill quality, fill level, location, and various other parameters associated with operations of the universal cassette. The universal cassette can be docked into a host device, such as an ATM, to facilitate the storage and retrieval of bills over a plurality of transactions. The universal cassette may be communicatively and/or electronically coupled to the host device, and the universal cassette and/or the host device may be communicatively coupled to a central computing system (e.g., a remote server), such as a financial institution server.

Together, the universal cassettes, host devices, and central computing system may form a cassette management system, capable of tracking fill levels, denominations, locations, and other information for one or more cassettes. In one example, a branch of a financial institution (e.g., a bank branch) may include at least one ATM and/or at least one teller station with a cash storage system configured to receive or dispense bills to a teller and/or a customer. Over time, the number of bills contained in the multiple cassettes of the ATM may gradually deplete as customers make withdrawals. In a similar manner, cassettes at the teller's station may fill over time, as customers make deposits. The filling and depletion of these cassettes may be tracked by the central computing system based on information provided by the cassettes themselves, such that when a cassette is full (e.g., the teller station cassette which has filled over time) or empty (e.g., the ATM cassette which as depleted over time), the central computing system may identify a replacement cassette. In this example, the central computing system may determine that the empty ATM cassette may be replaced by the full teller station cassette or vice versa.

Upon determining that a first cassette requires replacement, the central computing system may identify, based on a current location of the first cassette, a denomination associated with the first cassette, and/or one or more other attributes of the first cassette, a second, replacement cassette. In the example above, the central computing system may determine that the ATM cassette is nearly empty, and may identify the teller station's cassette as a suitable replacement based on the proximity of the two cassettes (e.g., both cassettes are at the same bank branch). The central computing system may then generate a notification that is presented to a user (e.g., a bank employee) via a user device, such as a computer or mobile device, which provides instructions for the user to swap the first and second cassettes, or at least to replace the first cassette with the second cassette. The user may then remove the first cassette from its host device and replace it with the second cassette. It will be appreciated that various other features and advantages of universal cassettes and the above-mentioned cassette management system will be described in greater detail below.

Referring first to FIG. 1, a block diagram of a cassette management system 100 is shown, according to some embodiments. As described briefly above, system 100 may be configured to track and/or manage a plurality of universal cassettes, such as by determining when one or more cassettes are full, near full, near empty, or empty, and subsequently identifying appropriate replacement cassettes or cassette swaps. In some embodiments, system 100 is implemented at a single location (e.g., a particular branch of a financial institution), although in other embodiments, system 100 may be implemented across multiple locations (e.g., across multiple branches belonging to the same parent company). For example, system 100 may be implemented to manage cassettes across all of the locations (e.g., branches) of a company within a geographical area, region, etc.

System 100 includes a central computing system, shown as server 102, which may be a "main" computing system for a particular company (e.g., a financial institution). In other words, server 102 may be configured to receive, process, and/or transmit data from/to a variety of systems, subsystems, or devices, and accordingly may be able to perform a variety of calculations, processes, estimations, etc., using this data. As described in greater detail below with respect to FIG. 3, server 102 may include a variety of components for executing instructions (e.g., via computer code) to perform these various actions. In some embodiments, server 102 is hosted or maintained by the same company that hosts/maintains the other components of system 100, described in detail below. In other embodiments, server 102 may be a component of a cloud service and/or may be hosted or implemented by a secondary company (e.g., other than the company that monitors/operates the various other components of system 100).

System 100 also includes teller station(s) 104 and automated teller machines (ATM(s)) 106. Teller station(s) 104 (i.e., teller systems) may include a variety of components utilized by a teller (i.e., a bank employee) to conduct transactions with a customer. For example, a teller station 104 can include one or more cash drawers or cassettes, a cash recycler, receipt validators/printers, a user interface, etc., that enable the teller to conduct transactions such as check cashing, deposits (e.g., of checks or bills), transfers, etc. In some embodiments, teller station(s) 104 include at least a user interface and a cash recycler configured to receive, store, and/or dispense bills (e.g., currency). For example, a teller may deposit a plurality of bills into a teller station 104, and teller station 104 may analyze (e.g., for quality/authenticity), count, sanitize, and/or store the bills in a plurality of cassettes. Likewise, teller station 104 may retrieve stored bills in response to a customer requesting funds (e.g., from the teller) by routing the bills from a cassette and through a bill path, to a bill input/output (I/O) slot.

ATM(s) 106 may be specialized devices that allow a user (e.g., a customer) to access an account held at a financial institution, such as to deposit, withdraw, or transfer funds, among other functions. Like teller station(s) 104, ATM(s) 106 may include a user interface and a housing having deposited therein at least one cassette for storing bills; however, in some cases, the housing(s) of ATM(s) 106 may each include multiple cassettes (e.g., for separate denominations of bills). When interacting with an ATM 106, a user may provide account information by inserting or wirelessly providing a bank card and/or may input (e.g., via the user interface) various account details (e.g., username, account number, password, etc.) to access the user's account. If the user wishes to withdraw funds, the user may identify an account to withdraw the funds from and may input a desired withdrawal amount. Upon confirmation/authentication of the user and/or the transaction, ATM 106 may retrieve appropriate bills from the one or more cassettes and may dispense the bills via an I/O slot.

As described herein, both teller station(s) 104 and ATM(s) 106 are examples of host devices, or devices that are configured to house and/or utilize one or more universal cassettes 108. Accordingly, it will be appreciated that the host devices described below can include teller station(s) 104 and ATM(s) 106, but are not limited to only these devices. Other host devices that utilize universal cassettes 108 are also contemplated by the present disclosure. For example, host devices may also include point-of-sale (POS) systems, cash recyclers (e.g., other than in a teller station), vending machines, or any other device that operates by receiving, storing, and/or dispensing bills. Examples of host devices, including teller station(s) 104 and ATM(s) 106, are described in greater detail below with respect to FIG. 4.

As mentioned briefly above, universal cassettes 108 are devices structured for installation or implementation in a host device, and are configured to receive, store, and/or dispense bills. Accordingly, universal cassettes 108 may include a storage area for holding any number of bills. In some embodiments, each of universal cassettes 108 may be configured to store a particular denomination of bill (e.g., only $20 bills). For example, universal cassettes 108 may be preconfigured (e.g., preprogrammed) to be associated with a particular denomination, or may determine an associated denomination of bill during filling or operation. For example, universal cassettes 108 may detect, via one or more sensors, a denomination of a first bill and may record this denomination. In some embodiments, the particular denomination stored by each of universal cassettes 108 may be determined by a position within a host device. For example, a first universal cassette 108 may be docked in a position associated with a particular denomination within the host device. In some embodiments, universal cassettes 108 may be configured to accept multiple denominations.

Unlike other cassettes, universal cassettes 108 may advantageously be designed to work with a variety of different host devices, therefore solving the technical problem of cross-device interoperability. In other words, universal cassettes 108 may be structured for installation in various types, styles, or models of host devices. For example, universal cassettes 108 may be adapted to be docked in both teller station(s) 104 and ATM(s) 106, and may be swapped between the two types of devices. Additionally, universal cassettes 108 may include a control circuit to perform a variety of functions not typically handled by a cassette (e.g., for an ATM or cash recycler). For example, universal cassettes 108 may be configured to detect a denomination, quality, and/or authenticity of stored bills, and may also track the number (i.e., amount) or fill level of stored bills. In this manner, it can be determined whether universal cassettes 108 are full, nearly-full, empty, or nearly-empty, and one or more automated actions can be initiated. Additional features and components of universal cassettes 108 are described in greater detail below with respect to FIG. 5.

In some embodiments, universal cassettes 108 may be considered "full" if a fill level of the cassette exceeds a first threshold (e.g., a maximum threshold). Likewise, in some embodiments, universal cassettes 108 may be considered "empty" if a fill level of the cassette exceeds a second threshold (e.g., a minimum threshold). In some embodiments, both a maximum and minimum threshold may be established for a particular cassette. For example, the "full" threshold for a first universal cassette may be 90% capacity, such that the universal cassette is considered full and in need of replacement or emptying once the fill level of the cassette reaches or exceeds 90%. The "empty" threshold for the first universal cassette may be 10% capacity, such that the universal cassette is considered empty and in need of replacement or refilling once the fill level of the cassette reaches or falls below 10%. In some embodiments, additional thresholds may also be set, such as a third threshold representing "nearly-full" (e.g., >80%) and/or a fourth threshold representing "nearly-empty" (e.g., <20%). Thus, it will be appreciated full, nearly-full, empty, or nearly-empty may represent any fill level or threshold, and that multiple thresholds may be established for a particular cassette.

As shown, each of server 102, teller station(s) 104, ATM(s) 106, and universal cassettes 108 may be communicatively coupled to a network 110. Network 110 may be wired or wireless network (e.g., Internet, intranet, VPN, etc.) configured to exchange data, values, instructions, messages, and the like between the components of system 100. Accordingly, each of server 102, teller station(s) 104, ATM(s) 106, and universal cassettes 108 may include an appropriate wired or wireless communications interface (i.e., network adaptor) to facilitate this communication. For example, teller station(s) 104 and/or ATM(s) 106 may communicate with server 102 via a telephone (e.g., cellular) network or a wired local network (e.g., LAN, WAN, etc.). As another example, universal cassettes 108 may communicate with a host device (e.g., teller station(s) 104 and/or ATM(s) 106) via a short-range, wireless network (e.g., WiFi, Bluetooth, etc.). It will be appreciated that these example network types are not intended to be limiting, and that network 110 may be configured as any appropriate type of network. Additionally, in some embodiments, network 110 may include multiple types of networks. For example, ATM(s) 106 and universal cassettes 108 may communicate via a short-range, wireless network, while ATM(s) 106 and server 102 communicate (e.g., simultaneously or nearly-simultaneously) via a wired network.

Figure 2A:
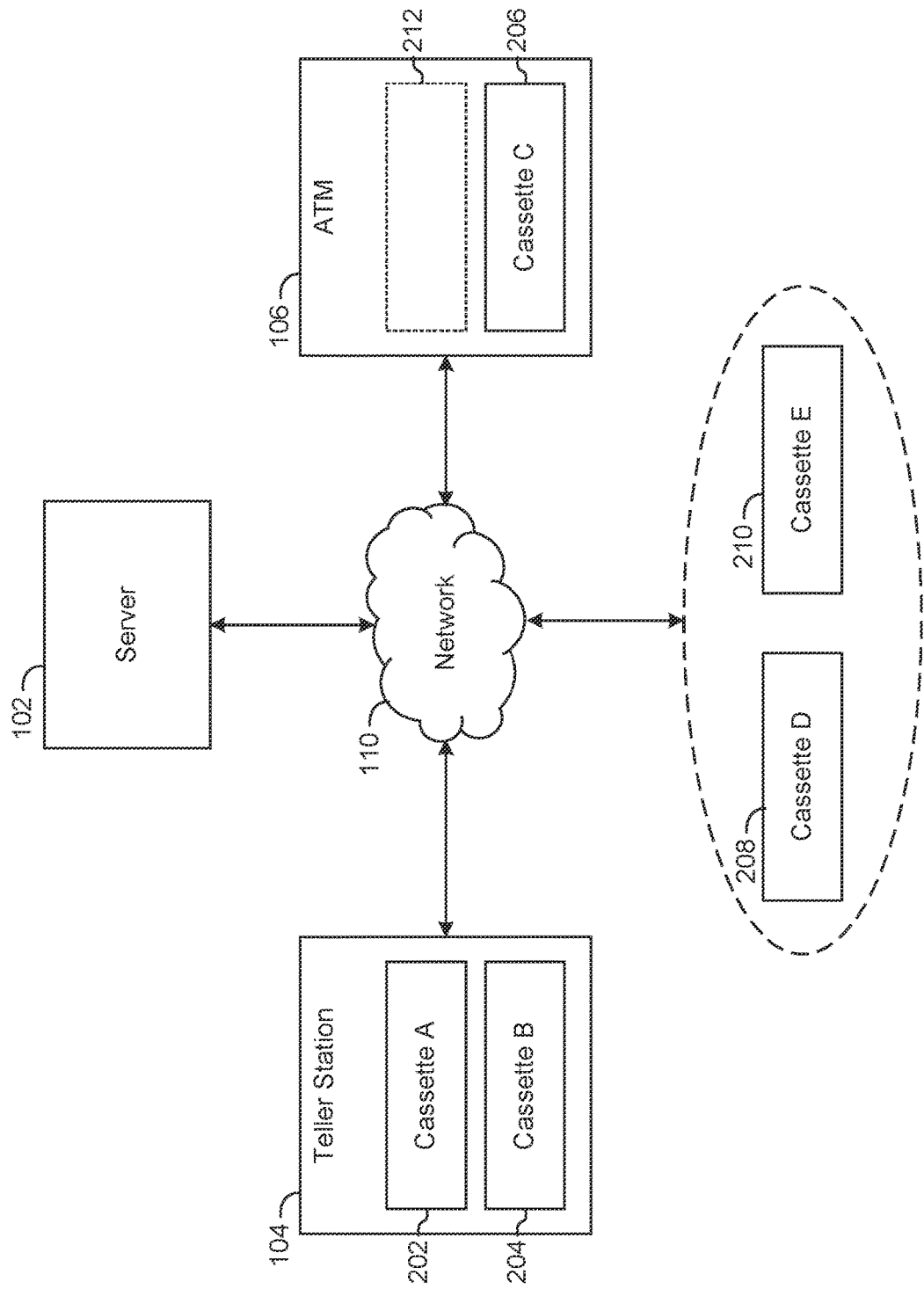

Referring now to FIGS. 2A and 2B, block diagrams illustrating the operation of system 100 are shown, according to some embodiments. More specifically, FIGS. 2A and 2B illustrate the replacement and/or movement of various universal cassettes (e.g., universal cassettes 108) throughout system 100, such as in response to one or more of the cassettes being identified as full or empty or, more generally, in response to the server 102 transmitting (e.g., to a teller station 104, to the ATM 106 when in service mode, to a user within a branch) an indication that a cassette needs to be moved from or to a particular destination (e.g., teller station 104, ATM 106, storage) determined by the server 102 based on information regarding one or more universal cassettes 108. Turning first to FIG. 2A, a teller station 104 is shown to include two universal cassettes 202 and 204, shown as "Cassette A" and "Cassette B," respectively. In some embodiments, teller station 104 may include a cash recycler or other similar device that houses and utilizes these cassettes for storing various bills. For example, cassette 202 may be configured to store a first denomination of bills and cassette 204 may be configured to store a second denomination of bills. It will be appreciated, however, that teller station 104 may include any number of cassettes and is not necessarily limited to the two cassettes shown in the example of FIG. 2A. Further, cassettes can be configured to store bills of mixed denominations.

In a similar manner, ATM 106 is shown to include a cassette 206 ("Cassette C") and an empty cassette slot 212. Like teller station 104, ATM 106 may include any number of cassettes and is not necessarily limited to the two cassettes or cassette slots shown in the example of FIG. 2A. Cassette slot 212 may be configured to receive a universal cassette, but in this example is not populated with a cassette (i.e., a cassette is not yet docked). For example, ATM 106 may be in the process of being stocked (e.g., prior to operation), which is why cassette slot 212 is empty. Additionally, FIG. 2A shows two additional cassettes 208 and 210 ("Cassette D" and "Cassette E," respectively) that are not currently docked in a host device. Cassettes 208 and 210 may be full and/or empty cassettes awaiting installation, and accordingly may be kept in a secure location, such as in a safe room or vault. In some embodiments, cassettes 208 and 210 are docked in a machine or system designed to fill and/or empty cassettes. For example, cassettes 208 and 210 may be docked in a cassette filling system to receive bills for later dispensing and/or to change an internal battery of the cassettes.

In one example, teller station 104 may receive a number of deposits over a period of time (e.g., over a few hours, a day, etc.) and, in turn, one of cassettes 202 or 204 may fill with bills. Once the fill level of cassettes 202 or 204 reaches a threshold (e.g., a maximum pre-set or predetermined fill level, such as a total amount, a height of a stack of bills selected from a range between 100 and 500 millimeters, etc.), the corresponding cassette and/or teller station 104 may generate and transmit (e.g., to server 102) a notification indicating that the cassette is full and in need of replacement. Server 102 may then identify a replacement cassette, in this case a cassette that is empty or near-empty, and may generate a second notification instructing a user (e.g., an employee) to replace the full cassette with the replacement cassette. This process is illustrated in FIG. 2B, where cassette 202, originally docked in teller station 104, may be identified as full (e.g., based on a fill level of the cassette exceeding a predetermined threshold) and may be selected by server 102 for installment into cassette slot 212 of ATM 106.

As shown in FIG. 2B, for example, a sensor in cassette 202 may detect a fill level of the cassette at regular intervals, or immediately following a transaction. Cassette 202 may determine, based on the fill level, that the cassette is nearly full, such as by comparing the fill level to a predetermined threshold, which may be a number of stored bills, a height of a stack of bills, or a fill percentage relative to the maximum fill value. Cassette 202 and/or teller station 104 may transmit a notification identifying cassette 202 and indicating that cassette 202 is nearly full to server 102 (e.g., via network 110) and, in some cases, also indicating a denomination of the bill stored in cassette 202. Server 102 may then identify a replacement cassette from cassettes 204-210 that is suitable for replacing cassette 202. For example, server 102 may identify a cassette that is empty or nearly-empty, that is configured to store a similar denomination of bills as cassette 202, and/or that is within a predefined geographical location with respect to cassette 202. In this case, server 102 may determine that cassette 208 is empty and is located at the same branch as cassette 202 (e.g., cassette 208 is stored in a vault at the same location as teller station 104), and may therefore identify cassette 208 as a replacement for cassette 202.

As shown, server 102 may determine, based on data received from ATM 106, that cassette slot 212 is empty. In some embodiments, server 102 also determines a particular denomination associated with cassette slot 212. For example, cassette slot 212 may require a cassette that stores $20 bills only. Accordingly, a cassette that is prefilled with $20 bills, or a cassette that is capable of storing $20 bills, may be identified. In this case, server 102 may determine that cassette 202, docked in teller station 104 and previously identified as full or nearly-full, is an appropriate cassette for installation in ATM 106.

After identifying a replacement cassette (e.g., cassette 208) for teller station 104 and/or ATM 106, server 102 may generate and transmit (e.g., to a user device such as a computer or mobile device) a notification that instructs (i.e., prompts) a user to replace cassette 202 with cassette 208, as shown in FIG. 2B. Additionally, the same notification or a second notification may instruct the user to install cassette 202 into ATM 106. The notification may be in the form of a pop-up or push notification, an email, a text message, a chat message, an automated phone call, or any other suitable notification. In some embodiments, the notification may be displayed on the ATM or teller station computing device when said ATM or device are in a service mode.

In another example, server 102 may determine that cassette 206 of ATM 106 is empty and that cassette 204 of teller station 104 is full. In some cases, server 102 may also determine that these cassettes are configured to accept a common bill (e.g., most frequently requested and/or dispensed as determined by the server 102) denomination. Server 102 may then generate a notification instructing the user to swap cassettes 204 and 206, such that the full cassette 204 can be used to dispense bills from ATM 106, while the empty cassette 206 can be filled at teller station 104.

Figure 3:
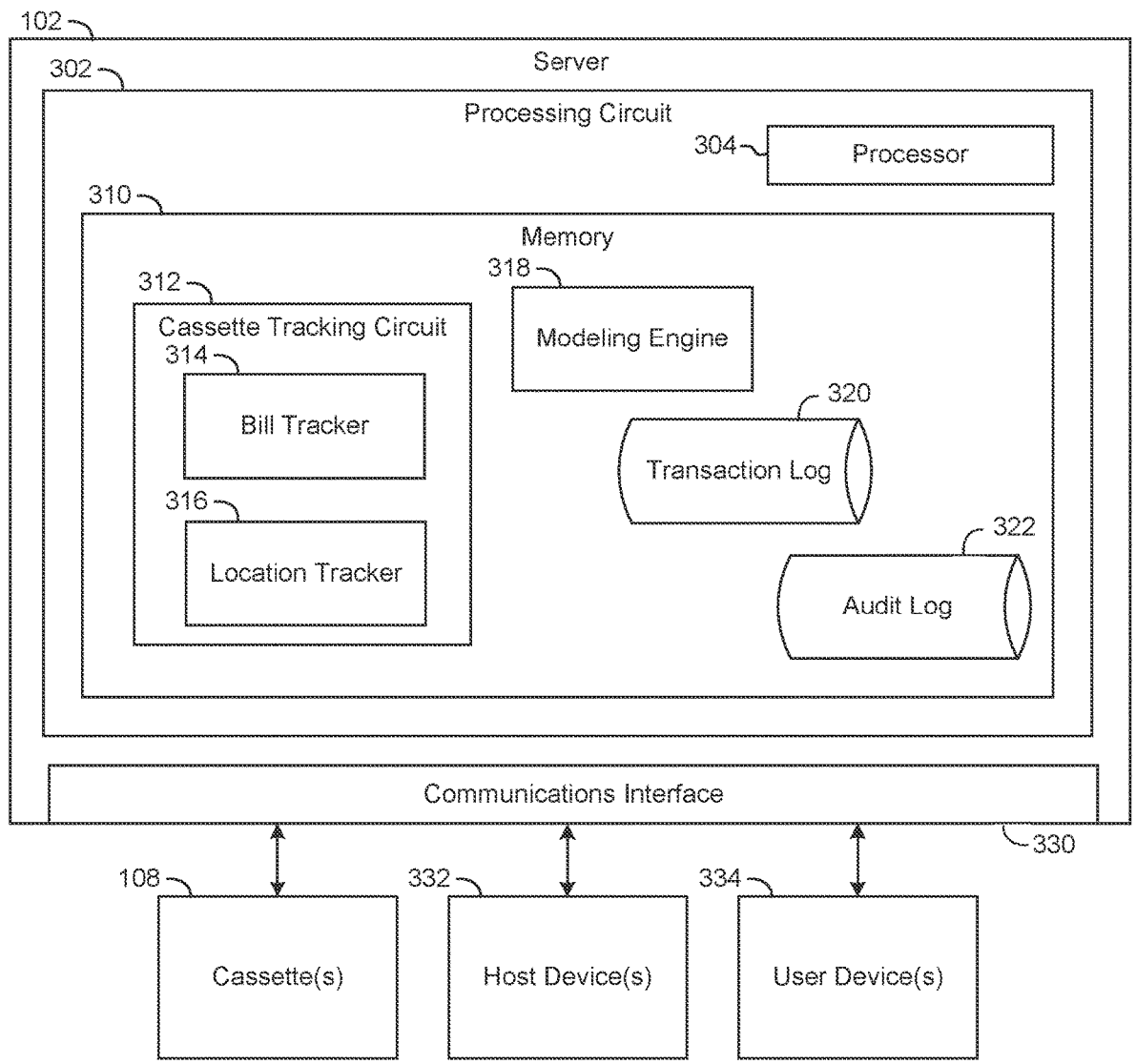
FIG. 3 is a block diagram of the server of the cassette management system of FIG. 1, according to some embodiments.

Referring now to FIG. 3, a detailed block diagram of server 102 is shown, according to some embodiments. As described briefly above, server 102 may be a "main" or central computing system for a company or institution. In some embodiments, server 102 is a remote computing system, not physically co-located with the other components of system 100. For example, server 102 may be a cloud server or other computing device operated (e.g., hosted and/or maintained) by a third party. As another example, server 102 may be physically located at a central branch of a financial institution (e.g., at a headquarters building) rather than at an individual branch. In some embodiments, however, server 102 is a central computing device for a single branch or a group of branches of a company or institution. For example, server 102 may be located at a single branch of a financial institution, and may communicate with equipment local to that branch, and/or at multiple other branches.

Server 102 is shown to include a processing circuit 302 that includes a processor 304 and memory 310. In various embodiments, processor 304 is implemented as a general-purpose processor, an application specific integrated circuit (ASIC), one or more field programmable gate arrays (FPGAs), a digital signal processor (DSP), a group of processing components, or other suitable electronic processing components structured to control the operation of server 102. Memory 310 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 310 may be or include volatile memory or non-volatile memory. Memory 310 may include database components, object code components, script components, or any other type of information structure for supporting the various activities and information structures described in the present application. According to an exemplary embodiment, memory 310 is communicatively connected to processor 304 via processing circuit 302 and includes computer code for executing (e.g., by processing circuit 302 and/or processor 304) one or more processes described herein.

Memory 310 is shown to include a cassette tracking circuit 314 that further includes a bill tracker 314 and a location tracker 316. Together, the components of cassette tracking circuit 314 are configured to track (i.e., monitor) the fill levels, locations, denominations, and any other suitable parameters of a plurality of universal cassettes (e.g., universal cassettes 108). In particular, bill tracker 314 may be configured to track at least a fill level and a denomination associated with each of a plurality of universal cassettes. In some embodiments, bill tracker 314 receives data indicating a fill level and/or a denomination from a universal cassette via a communications interface 330, described in detail below. Specifically, bill tracker 314 may receive fill level and denomination data from universal cassettes 108 at one or more time intervals. For example, bill tracker 314 may receive data in response to a query or request for the data (e.g., bill tracker 314 may transmit a prompt to a cassette), at a regularly scheduled time or interval (e.g., once per day, every 5 minutes, etc.), or continuously (e.g., in real-time, after each transaction).

Location tracker 316 may be configured to track a location of each of the plurality of universal cassettes 108, by receiving location data from the universal cassettes 108 and/or from a host device 332 associated with a universal cassette. Location data may include, for example, a street address, latitude and longitude, information provided by a global positioning system (GPS) transceiver associated with a cassette or host device, or other data that allows server 102 to determine a location of a cassette. In some cases, location data may include identifying information for a host device currently utilizing a universal cassette, such as a location, identification number, model number, etc., of the host device. Like bill tracker 314, location tracker 316 may receive location data once, or at regular time intervals. For example, the locations of universal cassettes 108 may be transmitted or requested when a cassette is docked or undocked, every 30 seconds, every hour, one per day or week, when a cassette power source (e.g., battery) reaches a predetermined depletion threshold (e.g., 5%, 10%), etc.

In addition to fill levels, denominations, and locations of universal cassettes 108, cassette tracking circuit 312 may track (i.e., monitor) various other parameters associated with universal cassettes 108. For example, cassette tracking circuit 312 may receive/retrieve a battery level, maintenance/repair details, transaction details, bill quality information, user access information, and any other parameters that may be provided by a universal cassette. In some embodiments, transaction details from host device(s) 332 and/or universal cassettes 108 may be used to generate transaction logs 320, stored in a database of memory 310. Transaction logs 320 may include information for each transaction processed by a host device/universal cassette, such as a type of transaction, user identifying information, account identifying information, a number of bills withdrawn/deposited, a time and location of the transaction, bill serial number(s) determined via optical character recognition (OCR), check serial number(s) determined via OCR or magnetic ink character recognition (MICR) for cassettes configured to store checks, etc.

Similarly, various other parameters/data may be used to generate audit logs 322. Audit logs 322 may include a variety of information that is required for an audit (e.g., of a financial institution) and/or that may aid in the tracking and security of universal cassettes 108. For example, location data (e.g., including indications of when a cassette is moved), user access data, fill levels, fill/refill times, maintenance/repairs, and other information may be recorded via audit logs 322, such that a user (e.g., an auditor, a branch manager, etc.) can access audit logs 322 at any time to review said information for each of universal cassettes 108.

Memory 310 is also shown to include a modeling engine 318, configured to execute predictive models for simulating operations of system 100. Predictive models are generally mathematical representations of various operations of system 100 that, when executed by server 102 using a set of input values, can predict or estimate an output (e.g., a result). For example, a predictive model may be executed to estimate how quickly a universal cassette is filled, based on historical transaction or fill level data, a location of the universal cassette, etc. Modeling engine 318 may generate and/or execute any type of predictive model, such as neural networks, random forests, decision trees, least squares, etc. Over time, modeling engine 318 may also improve or dynamically update these predictive models as additional data is collected (e.g., by cassette tracking circuit 312).

In some embodiments, modeling engine 318 is configured to predict usage for one or more of universal cassettes 108. For example, based upon a host device that a universal cassette is docked to and/or a location of the universal cassette, modeling engine 318 may be configured to predict how quickly the universal cassette will fill or empty. In this manner, modeling engine 318 may be able to predict and/or generate a projection (schedule) for replacing the universal cassette preemptively (e.g., before it is full or empty).

Likewise, in some embodiments, modeling engine 318 may predict bill requirements based on the location of a host device or a universal cassette. For example, modeling engine 318 may analyze historical data to determine that particular location dispenses a particularly high number of $20 bills each day, such that it may be beneficial to increase the frequency with which the universal cassettes at that location are replaced. As another example, historical data may indicate that an ATM at a specific location experiences in influx in transactions on a certain day or weekend (e.g., corresponding to a particular event, such as a fair, a Friday night in a busy area, etc.). Modeling engine 318 may identify these trends and adjust a schedule or frequency with which universal cassettes 108 are replaced/refilled.

Still referring to FIG. 3, communications interface 330 may be configured for transmitting and receiving various data and signals with other components of system 100. As shown, for example, server 102 can communicate with universal cassettes 108, host devices 332, and user devices 334 via communications interface 330. Accordingly, communications interface 330 can include a wireless network interface (e.g., 802.11X, ZigBee, Bluetooth, Internet, etc.), a wired network interface (e.g., Ethernet, USB, Thunderbolt, etc.), or any combination thereof.

As described above, host devices 332 can include any devices that are configured to house and/or utilize one or more universal cassettes 108. In some embodiments, host devices 332 includes at least teller station(s) 104 (e.g., including cash recyclers) and ATM(s) 106. Other host devices 332 may include point-of-sale (POS) systems, cash recyclers (e.g., other than in a teller station), vending machines, or any other device that operates by receiving, storing, and/or dispensing bills. Host devices 332 are described in greater detail below with respect to FIG. 4.

User devices 334 can include, but are not limited to, mobile phones, electronic tablets, laptops, desktop computers, workstations, and other types of electronic devices. More generally, user devices 334 may include any electronic device that allows a user to interact with server (e.g., through a user interface). Accordingly, each of user devices 334 can include an input device (e.g., a keyboard) and an output device (e.g., a screen). In one example, user device 334 is a computer that provides user access to the operations of server 102 to allow the user to view operating, transaction, or audit data (e.g., cassette locations and fill levels, predicted future bill requirements, audit logs 332, etc.), change various settings or parameters of server 102, and/or provide user-defined control inputs to control operations of the server 102.

Figure 4:
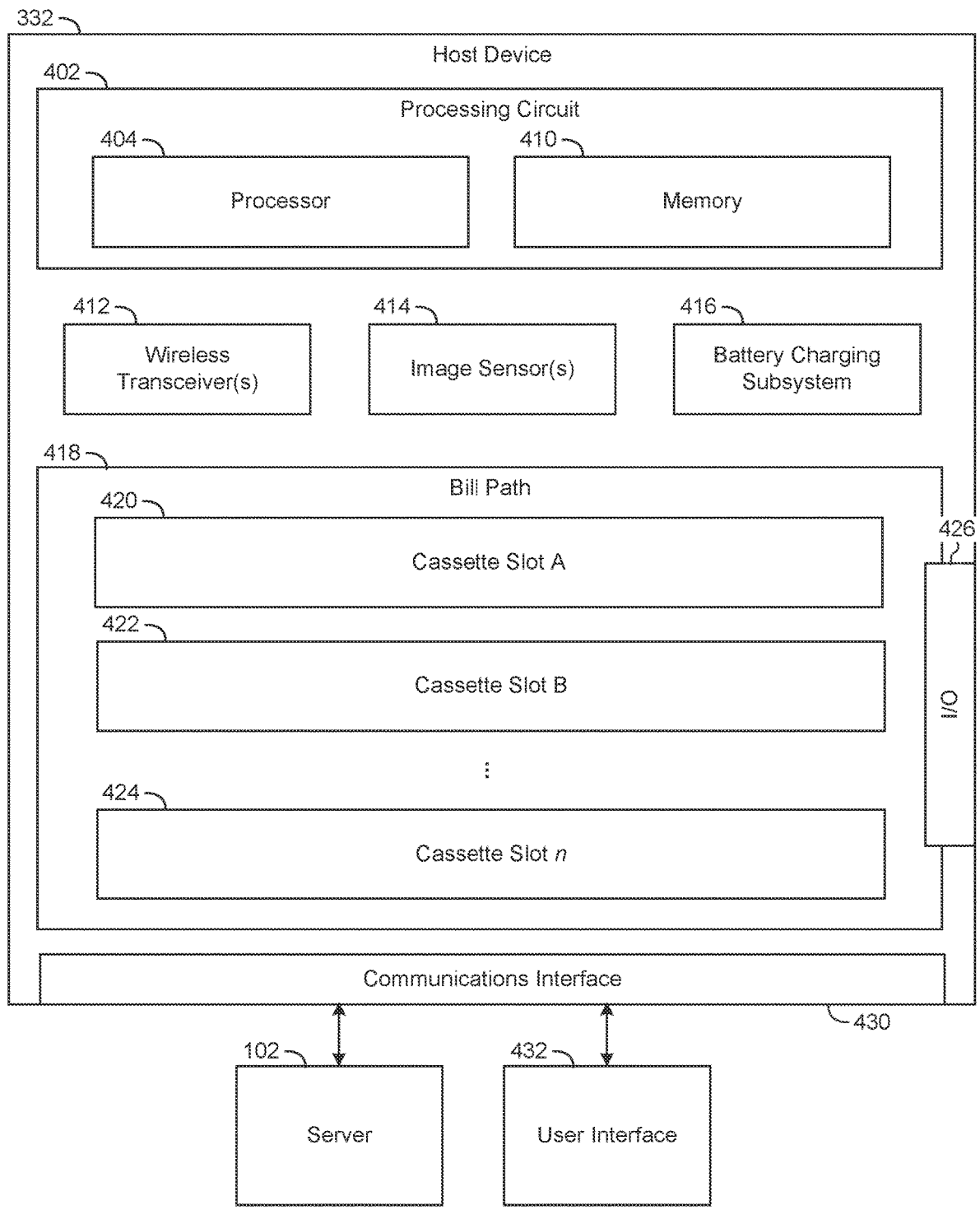
FIG. 4 is a block diagram of a host device for a universal cassette, such as the teller stations or ATMs in the cassette management system of FIG. 1, according to some embodiments.

Referring now to FIG. 4, a detailed block diagram of a host device (e.g., one of host device(s) 332) is shown, according to some embodiments. As described above, a host device may be any device configured to house and/or utilized universal cassettes 108. For example, host device 332 may represent an ATM (e.g., ATM 106), a teller station (e.g., teller station 104), a cash recycler, a POS system, a vending machine, or any other device that contains one or more cassettes for receiving or dispensing bills.

Like server 102, host device 332 includes a communication interface 430 configured for transmitting and receiving various data and signals with other components of system 100. As shown, for example, host device 332 can communicate with at least server 102 and a user interface 432 via communications interface 430. Accordingly, communications interface 430 can include a wireless network interface (e.g., 802.11X, ZigBee, Bluetooth, Internet, etc.), a wired network interface (e.g., Ethernet, USB, Thunderbolt, etc.), or any combination thereof.

User interface 432 can include an input device (e.g., a keyboard) and an output device (e.g., a screen) to allow a user to interact with host device 332. In some embodiments, user interface 432 may be part of a user device (e.g., user device 334), such as a mobile phone, electronic tablet, laptop, desktop computer, workstation, and other type of electronic device. In other embodiments, user interface 432 is a screen and input device of host device 332 itself. In an example where host device 332 is an ATM (e.g., ATM 106), user interface 432 may be a screen of the ATM, a number pad, and/or one or more additional keys for performing various functions, such as completing a transaction. In this example, a user (e.g., a customer) may use user interface 432 to input account information (e.g., a PIN) and transaction information (e.g., a type of transaction, an amount to deposit/withdraw, etc.), as well as to view information such as an account balance.

Still referring to FIG. 4, host device 332 is also shown to include a processing circuit 402 that includes a processor 404 and memory 410. In various embodiments, processor 404 is implemented as a general-purpose processor, an application specific integrated circuit (ASIC), one or more field programmable gate arrays (FPGAs), a digital signal processor (DSP), a group of processing components, or other suitable electronic processing components structured to control the operations of host device 332. Memory 410 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 410 may be or include volatile memory or non-volatile memory. Memory 410 may include database components, object code components, script components, or any other type of information structure for supporting the various activities and information structures described in the present application. According to an exemplary embodiment, memory 410 is communicatively connected to processor 404 via processing circuit 402 and includes computer code for executing (e.g., by processing circuit 402 and/or processor 404) one or more processes described herein.

Host device 332 is also shown to include one or more wireless transceivers 412. Wireless transceivers 412 may include any device configured to transmit and receive wireless data or signals. For example, wireless transceivers 412 may include one or more components for communicating via VHF or UHF radio waves. In some embodiments, wireless transceivers 412 include at least a long-range and a short-range style transceiver, although in other embodiments, wireless transceivers 412 include either a long or short-range transceiver. In some embodiments, wireless transceivers 412 include at least one of a WiFi, Bluetooth®, or radio-frequency identification (RFID) transceiver. It will be appreciated, however, that wireless transceivers 412 are not limited to just these examples of wireless transceiver devices/technologies, and that any type of wireless transceiver may be included in host device 332. In some embodiments, wireless transceivers 412 may also be coupled to, or a portion of, communications interface 430. For example, a WiFi transceiver may be utilized to communicate with other components of system 100 via communications interface 430.

Host device 332 is also shown to include image sensors 414 configured to capture image data. More specifically, image sensors 414 may be configured to read QR codes, barcodes, or other similar identification tags, such as to identify a universal cassette docked into host device 332. Accordingly, image sensors 414 may include a light source, one or more lenses, and sensors for receiving optical pulses or other image data. However, image sensors 414 may also include any other components sufficient to read said identification tags. In one example, image sensors 414 include at least a QR code scanner and/or a barcode reader for scanning and interpreting QR codes or barcodes attached to an outer housing/shell of a universal cassette.

By scanning said identification tags, host device 332 may determine that a universal cassette is docked and may also determine additional information regarding the universal cassette. For example, host device 332 may determine an identification code for a universal cassette, and may transmit the code or send a request to server 102. Server 102 may respond by sending data such as a name or identifier for the cassette, parameters associated with the cassette (e.g., denomination, fill level, etc.), and any other information related to the identified cassette. In some embodiments, server 102 may also update a database (e.g., transaction logs 320 and/or audit logs 332) once a notification and/or identification code for a cassette is received, in order to track the cassettes. In some embodiments, to maintain a closed cash cycle within a branch, the server 102 may maintain a database of cassettes cross-referenced to particular allowable locations (e.g., host device identifiers, geographical area). The host device 332 may be structured to transmit this information, when a particular cassette is docked, to the server 102, and the server 102 may, based on cross-referencing this information to the database, generate an electronic message to the host device 332 to accept or reject a particular cassette.

Host device 332 is also shown to include a battery charging subsystem 416. Battery charging subsystem 416 may include one or more components configured to charge a battery of a docked universal cassette. In particular, battery charging subsystem 416 may include an interface or electrical connector for electrically coupling a battery of a universal cassette to battery charging subsystem 416, and may also include a circuit for monitoring and controlling the charging of the universal cassette. For example, battery charging subsystem 416 may include a battery management system (BMS) for monitoring charge levels of each of one or more universal cassettes 108 docked into host device 332, and for controlling the charging of the one or more universal cassettes 108 (e.g., by limiting charge speed and power). It will be appreciated that battery charging subsystem 416 may be an optional component of host device 332 not included in systems where universal cassettes 108 do not include internal batteries.

During a transaction, a user (e.g., a bank customer, a teller, etc.) may insert or withdraw bills from an I/O port 426. I/O port 426 may be a unidirectional or bidirectional port or slot, configured to receive and/or dispense bills. Bills being deposited, for example, may be received via I/O port 426 and may travel along a bill path 418. Bill path 418 may include a series of gears, rollers, belts, motors, tracks, etc., for transporting bills between components of host device 332. Specifically, bills may be transported from/to I/O port 426 to one of a series of cassettes docked into a plurality of cassette slots 420-424.

As shown, host device 332 may include any number of cassette slots, configured to receive a universal cassette (e.g., one of universal cassettes 108). In other words, a cassette slot may be a "dock" for a universal cassette, and may include a series of connections for electronically or communicatively coupling the universal cassette to host device 332. As an example, a universal cassette may be removably docked into cassette slot 420 ("Cassette Slot A"), thereby allowing bills to be stored in the docked cassette. In some embodiments, each of cassette slots 420-424 are associated with a different denomination or type of bill. For example, cassette slot 422 ("Cassette Slot B") may be associated with $10 bills; therefore, a universal cassette docked into cassette slot 422 may be configured to store $10 bills either before or during installation.

Figure 5:
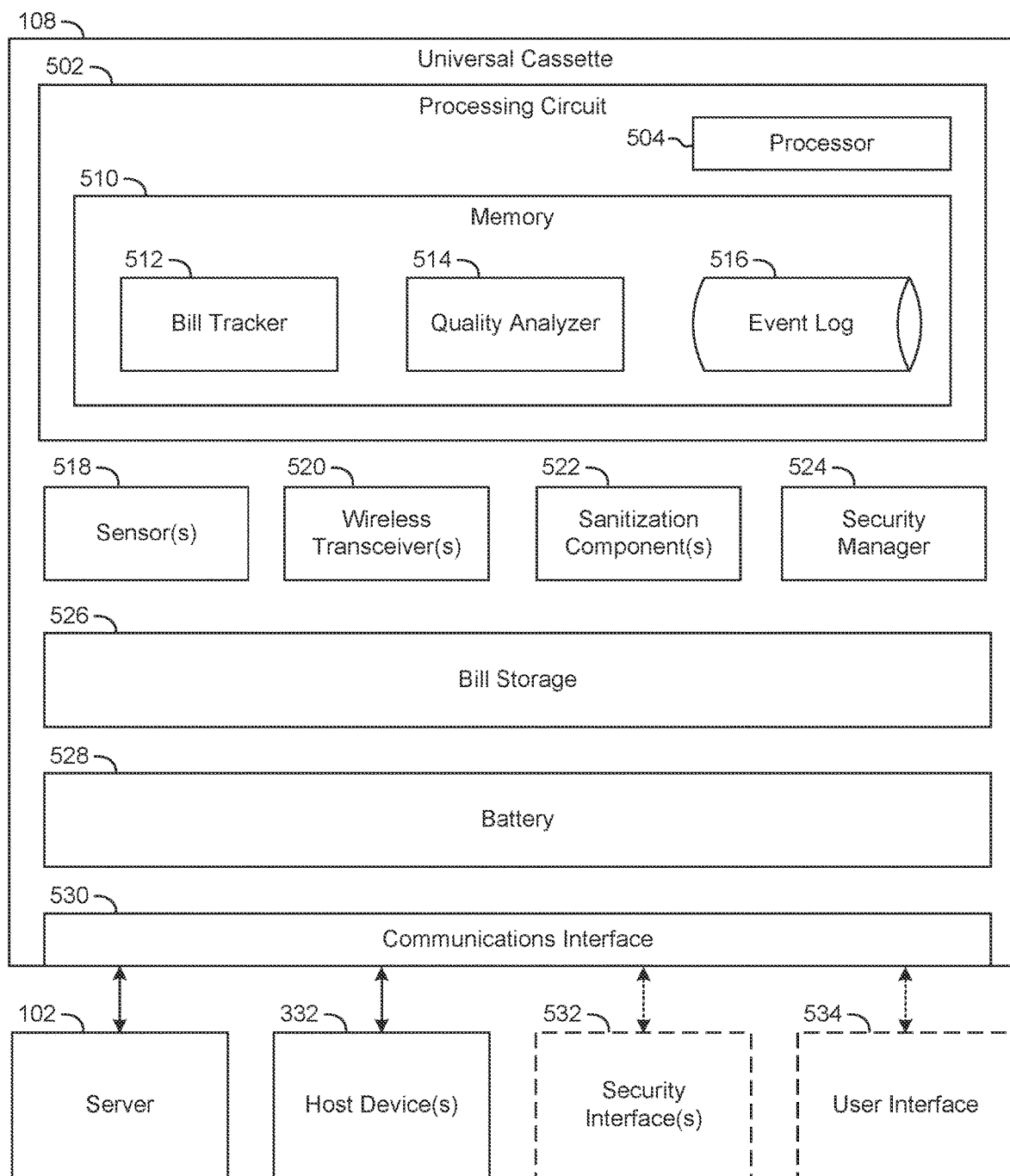
FIG. 5 is a block diagram of a universal cassette, such as the universal cassette included in the cassette management system of FIG. 1, according to some embodiments.

Referring now to FIG. 5, a detailed block diagram of a universal cassette 108 (i.e., one of universal cassettes 108) is shown, according to some embodiments. As mentioned above, universal cassette 108 may advantageously be utilized in multiple systems (e.g., ATMs, teller stations, POS systems, etc.) and may also include smart functionality not found in other types of cassettes. For example, universal cassette 108 may be configured to track a number of stored bills and can determine its current location, which can be transmitted to the other components of system 100 for accurate cassette tracking. Additionally, universal cassette 108 can alert server 102 when a bill storage area is full, nearly full, nearly empty, or empty, allowing server 102 to automatically identify a replacement cassette.

Like server 102 and host device 332, universal cassette 108 includes a communication interface 530 configured for transmitting and receiving various data and signals with other components of system 100. As shown, for example, universal cassette 108 can communicate with at least server 102 and host device 332 via communications interface 530. Accordingly, communications interface 530 can include a wireless network interface (e.g., 802.11X, ZigBee, Bluetooth, Internet, etc.), a wired network interface (e.g., Ethernet, USB, Thunderbolt, etc.), or any combination thereof.

In some embodiments, universal cassette 108 may also communicate with additional components such as security interfaces 532 and/or a user interface 534. It will be appreciated, however, that security interfaces 532 and/or user interface 534 may be optional components depending on an embodiment of universal cassette 108. Security interfaces 532 may include any of a number of components or devices for controlling access/entry to universal cassette 108, and in particular to a bill storage area (e.g., bill storage 526) of universal cassette 108. In particular, security interfaces 532 may include finger print scanners, a number pad, an electronic lock, an identification card reader, a biometrics scanner, or any other interfaces that allow a user to input security/access information. Security interfaces 532 may operate cooperatively with security manager 524, described in detail below, to restrict, track, and/or control access to universal cassette 108.

Security manager 524 may analyze inputs to security interfaces 532 in order to identify users (e.g., attempting to access or manipulate universal cassette 108) and authorize access. Security manager 524 may be configured to receive user identification data, such as a username, password, PIN, access card number, or other information entered via security interfaces 532 or user interface 534. As an example, a user may transmit a lock code electronically, via an e-lock on the user's mobile device, to security interfaces 532. Security manager 524 may interpret the lock code and grant or deny access to universal cassette 108. In some embodiments, security manager 524 may communicate (e.g., via communications interface 530) with server 102 to access a central authentication or access system that maintains user records. For example, security manager 524 may transmit identifying information for a user attempting to access universal cassette 108 (e.g., an ID number, a name, etc.) to server 102, and server 102 may access an authentication system to verify the user's details. Assuming the user can be authenticated, server 102 may transmit a notification back to universal cassette 108, causing universal cassette 108 to grant the user access.

In some embodiments, security interfaces 532 described above include at least a manual or electronic lock configured to restrict access to bill storage 526. In some such embodiments, universal cassette 108 may remain locked when not docked to a host device to prevent unauthorized access. In some embodiments, security manager 524 may be configured to track access to universal cassette 108 and/or bill storage 526, such as by determining and recording when a key, access code, etc., is inserted/entered to unlock the cassette. Security manager 524 may be configured update event log 516 each time universal cassette 108 is unlocked, in order to track any opening of the cassette or access to bill storage 526.

User interface 534 can include an input device (e.g., a keyboard) and an output device (e.g., a screen) to allow a user to interact with universal cassette 108. For example, user interface 534 may include a screen and a number or keypad that allows a user to interact directly with universal cassette 108. In some embodiments, one or more components of user interface 534 may also be utilized as security interface 532. For example, a user may interact with a number pad of user interface 534 to enter a PIN or security access code.

Still referring to FIG. 5, universal cassette 108 is shown to include a processing circuit 502 that includes a processor 504 and memory 510. Together with the other components of universal cassette 108, described in detail below, processing circuit 502, processor 504, and memory 510 form at least a portion of a control circuit for universal cassette 108. In various embodiments, processor 504 is implemented as a general-purpose processor, an application specific integrated circuit (ASIC), one or more field programmable gate arrays (FPGAs), a digital signal processor (DSP), a group of processing components, or other suitable electronic processing components structured to control the operations of universal cassette 108.

Memory 510 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 510 may be or include volatile memory or non-volatile memory. Memory 510 may include database components, object code components, script components, or any other type of information structure for supporting the various activities and information structures described in the present application. According to an exemplary embodiment, memory 510 is communicatively connected to processor 504 via processing circuit 502 and includes computer code for executing (e.g., by processing circuit 502 and/or processor 504) one or more processes described herein.

Memory 510 is shown to include a bill tracker 512, configured to track a number of bills stored in bill storage 526 and/or to determine a fill level of the cassette (e.g., the fill level of bill storage 526). In particular, bill tracker 512 may receive data from one or more sensors 518 that indicates a fill level of bill storage 526, and may track the fill level and/or the number of bills over time. Sensors 518 may include any of a plurality of sensors for measuring various parameters associated with the operations of universal cassette 108. In this case, sensors 518 may include an optical sensor or other similar sensor that can count each bill as it is deposited into or retrieved from bill storage 526. For example, as bills pass said sensor, bill tracker 512 may add or subtract from a count of the total number of bills in bill storage 526.

In some embodiments, sensors 518 includes a fill sensor, configured to measure a height of a stack of bills in bill storage 526, or to otherwise measure a fill level of bill storage 526. In such embodiments, the fill sensor may include one or more switches, an optical sensor, or any other suitable sensor that can determine the fill level or dimensions of the stack of bills in bill storage 526. Bill tracker 512 may determine a fill level of bill storage 526 based on data from sensors 518, and can track the fill level over time. In some embodiments, sensors 518 can include multiple sensors for both counting a number of bills in bill storage 526 and for determining the fill level of bill storage 526.

In some cases, it may be advantageous to track both the bill count and fill level of universal cassette 108, because bills often vary in dimensions between locations (e.g., regions, countries, states, climates, etc.), and based on age or quality. For example, well worn, old, or used bills may be significantly thicker than brand new bills, meaning that fewer bills can fit in bill storage 526. Similarly, bills may be slightly thicker in areas with high humidity when compared to bills in areas of low humidity. Accordingly, a count of the bills as they enter/exit universal cassette 108 and a fill level of bill storage 526 can be used together to determine how many bills will fit in bill storage 526 and/or to determine when bill storage 526 is nearing full or empty.

In some embodiments, bill tracker 512 may constantly or at least regularly adjust a threshold (i.e., limit) indicating that bill storage 526 is full, nearly full, nearly empty, or empty, based on sensor 518 data. For example, bill tracker 512 may compare bill counts and fill levels at regular time intervals (e.g., every few minutes, once per day, etc.) to learn the quality and size of the bills in a current location. This knowledge of bill thickness, counts, fill levels, etc., can be used to adjust the threshold for universal cassette 108 in real-time or near real time, making universal cassette 108 much more flexible than other cassettes by more accurately tracking fill levels.

In some embodiments, bill tracker 512 may operate cooperatively with a quality analyzer 514, which may also utilize data from one or more sensors 518 to determine various bill quality parameters. In this case, sensors 518 may include sensors that measure an age or condition of incoming bills, and may also include sensors that determine the authenticity of the bills. For example, optical sensors or other appropriate sensors can scan passing bills (e.g., entering bill storage 526) to detect counterfeit bills and/or to detect non-recyclable bills (i.e., bills that are too old or worn for recirculation). Quality analyzer 514 may also determine, based on the sensor data, dimensions of the bills (e.g., thickness), which may be used to determine the number of bills that can be stored in bill storage 526 before reaching the threshold.

In some embodiments, quality analyzer 514 may detect non-recyclable (e.g., counterfeit, worn, etc.) bills, and may transmit an alert to host device 332 and/or server 102. In such embodiments, host device 332 may alter a transportation path of the non-recyclable bills, such as by routing the bills to a cassette specifically allocated for holding non-recyclable bills. In some embodiments, such as when counterfeit bills are detected, quality analyzer may alert server 102, which may cause server 102 to save transaction details for additional investigation.

In some embodiments, certain sensors 518 may be mounted on, or a part of, host device 332 rather than universal cassette 108. In such embodiments, host device 332 and universal cassette 108 may share sensor data, allowing universal cassette 108 to utilize these external sensors to perform its various functions. It will also be appreciated that sensors 518 may include any number of additional sensors not described herein. For example, sensors 518 may also include sensors for detecting a battery level of battery 528 and sensors for identifying bill denominations.

Still referring to FIG. 5, memory 510 is also shown to include (e.g., retrievably store) an event log 516 for recording transaction and event data. Specifically, event log 516 may store transaction, bill count, fill level, and/or bill quality details, as well as storing records of universal cassette 108's geographical location, battery levels, maintenance events, etc. In other words, event log 516 may act as an audit log for an individual cassette, tracking any and all event that occur before, during, and after installing universal cassette 108 in a host device.

In some embodiments, event log 516 may record a date, time, location, host device identification, and other suitable information each time universal cassette 108 is docked into a host device, or each time universal cassette 108 is moved. Event log 516 may also record a date, time, location, user ID, and other information each time universal cassette 108 is accessed by a user, such as to empty or fill bill storage 526, or to service universal cassette 108. For example, a log may be created each time universal cassette 108 is service, maintained, or calibrated, to ensure that universal cassette 108 is operating correctly and accurately.

Still referring to FIG. 5, universal cassette 108 is shown to include wireless transceivers 520. Like wireless transceivers 412 of host device 332, wireless transceivers 520 may include any device configured to transmit and receive wireless data or signals. For example, wireless transceivers 520 may include one or more components for communicating via VHF or UHF radio waves. In some embodiments, wireless transceivers 520 include at least a long-range and a short-range style transceiver, although in other embodiments, wireless transceivers 520 include either a long or short-range transceiver. In some embodiments, wireless transceivers 520 include at least one of a WiFi, Bluetooth®, a cellular, or radio-frequency identification (RFID) transceiver. It will be appreciated, however, that wireless transceivers 520 are not limited to just these examples of wireless transceiver devices/technologies, and that any type of wireless transceiver may be included in universal cassette 108. In some embodiments, wireless transceivers 520 may also be coupled to, or a portion of, communications interface 530. For example, a WiFi transceiver may be utilized to communicate with other components of system 100 via communications interface 530.

In some embodiments, wireless transceivers 520 also include one or more devices or components for detecting a location of universal cassette 108. In such embodiments, wireless transceivers 520 can include a GPS transceiver configured to detect a geographical location (e.g., latitude and longitude) of universal cassette 108 in real or near-real time. In some embodiments, wireless transceivers 520 include cellular transceivers for exchanging wireless data with one or more cellular towers. In such embodiments, a location of universal cassette 108 may be determined based on a nearby tower or towers, such as by using triangulation based on the coordinates of one or more cellular towers. However, in other embodiments, a location of universal cassette 108 is determined based on a connected host device. For example, universal cassette 108 may lack components for determine its location, and may instead determine a location based on the connected host device.

In some embodiments, universal cassette 108 includes sanitation components 522. Sanitation components may include one or more devices for sanitizing or otherwise cleaning incoming or stored bills. For example, sanitation components 522 can include an ultra-violet (UV) light source, such as UV-C LEDs, that may irradiate bills before or during storage. Sanitation components 522 are generally configured to kill or deactivate harmful bacteria or viruses that may be present on the surface of bills.

As briefly mentioned above, universal cassette 108 may also include battery 528 for powering the various components described above. Battery 528 may be any suitable rechargeable or replaceable battery, structured to provide a sufficient amount of power to operate the components of universal cassette 108. For example, battery 528 may be a rechargeable NiCad, NiMH, or li-ion battery. In some embodiments, when universal cassette 108 is docked into host device 332, battery 528 may be recharged via battery charging subsystem 416. In other embodiments, battery 528 is recharged via a separate or external battery charging system. For example, battery 528 may be recharged when universal cassette 108 is docked into an external refilling/docking station. Battery 528 may be capable of providing power to universal cassette 108 for at least a predetermined amount of time. For example, battery 528 may be sized to provide at least eight hours of power before being recharged, over even multiple weeks of power. Advantageously, this allows universal cassette 108 to operate without being docked to a host device, such as by sending location updates at regular intervals when a cassette is in transit In some embodiments, when not docked into a host device, universal cassette 108 sends location data and/or a battery level indication to server 102 at regular intervals. For example, universal cassette 108 may transmit location and battery data every hour when not connected to a host device. In some embodiments, universal cassette 108 may also transmit a notification to server 102 when the cassette is undocked from a host device, and/or when universal cassette 108 is undocked for a predetermined length of time. For example, universal cassette 108 may transmit an alert, including at least location data, if universal cassette 108 is undocked from a host device for more than five minutes.

Although not shown in FIG. 5, universal cassette 108 may also include a QR code, bar code, and/or RFID tag, used to detect universal cassette 108 (e.g., during or after installation into a host device) and to identify a variety of information about universal cassette 108. Said codes or tags may be positioned on an outer housing or shell of universal cassette 108, for example, such that wireless transceivers 412 and/or image sensors 414 of host device 332 can read/scan the codes during installation or docking of universal cassette 108.

Figure 6:
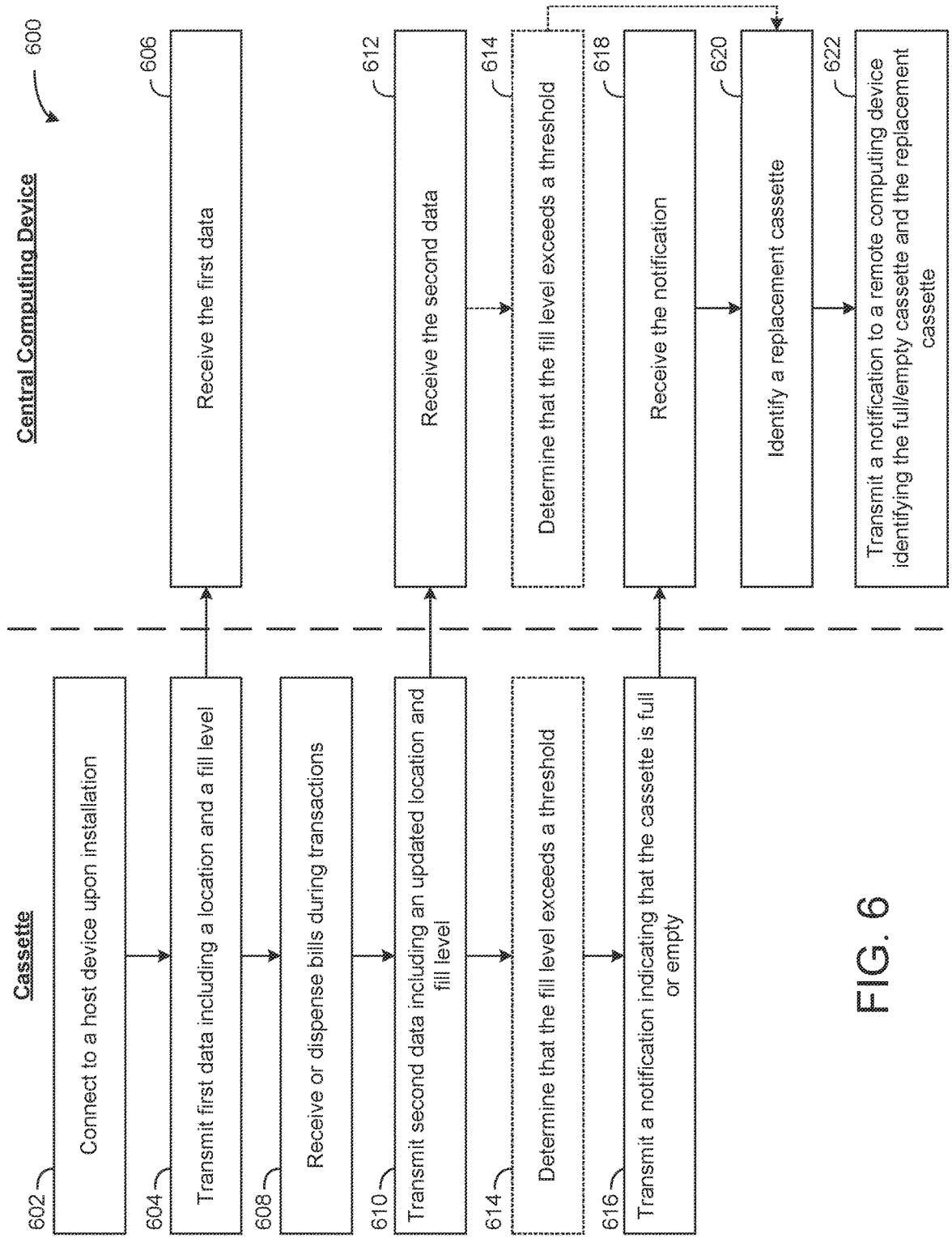
FIG. 6 is a flow diagram illustrating a process for identifying and replacing full or empty cassettes, according to some embodiments.

Referring now to FIG. 6, a flow diagram illustrating a process 600 for identifying and replacing full or empty cassettes is shown, according to some embodiments. In some embodiments, process 600 is implemented by one or more of the components of system 100. Specifically, certain steps of process 600 may be implemented by a universal cassette (e.g., universal cassettes 108) and/or a host device (e.g., host device(s) 332), while other steps may be implemented by a central computing system (e.g., server 102). It will be appreciated that certain steps of process 600 may be optional and, in some embodiments, process 600 may be implemented using less than all of the steps.

Process 600 may, advantageously, allow for the tracking of universal cassettes (e.g., universal cassettes 108) with minimal manual interference. For example, process 600 may automatically or semi-automatically identify universal cassettes that are in need of replacement, identify replacement cassettes based on various parameters, and alert a user (e.g., a bank employee) to initiate a swap of the identified cassettes. In this regard, process 600 may ensure that all of the cassettes utilized by a company (e.g., financial institution) contain an appropriate number of bills, to reduce interruptions or customer dissatisfaction due to empty or full cassettes, which may take time to replace and may prevent certain operations of a host device (e.g., an empty ATM cannot dispense requested funds). Process 600 may also allow a company to accurately track cassette movement and usage for improved auditing, security, and maintenance.

At step 602, a first universal cassette is docked and/or connected to a host device. Docking the first universal cassette to the host device may include, for example, placing the first universal cassette into a secured portion of the host device and/or electronically coupling the two devices. In some embodiments, the first universal cassette may include an external electrical/communications connection that may mate with a corresponding connection on the host device during docking, to couple the two devices. This electrical connect may provide energy to the first universal cassette (e.g., to charge an internal battery or to power a control circuit) and, in some cases, may provide a path for the first universal cassette and the host device to exchange data.

At step 604, the first universal cassette transmits first data including at least a current location and a fill level of the first universal cassette. The first universal cassette may transmit the first data to a central computing system, such as a server, via a wired or wireless connection. For example, the first universal cassette may connect to a WiFi or cellular network to wirelessly transmit the first data. In another example, the first universal cassette may communicate via a wired connection, such as via the host device. In this example, the host device (e.g., a teller station) may be hard-wired to a network and/or the central computing device, such that the host device can relay information from the first universal cassette.

Prior to transmitting the first data, the first universal cassette may determine a current location based on one or more internal sensors/transceivers, or based on location data receive from the host device. In some embodiments, the first universal cassette includes a GPS transceiver used to detect the cassette's current location in real time, or at regular intervals. For example, the first universal cassette may regularly determine a current latitude and longitude, which is include in the first data.

In some embodiments, the first universal cassette includes a cellular transceiver or other similar wireless transceiver for detecting location by triangulation, or based on the location of a nearest beacon or tower. For example, the first universal cassette may triangulate its position based signals received from one or more cellular towers. As another example, the first universal cassette detects its location using a WiFi positioning system (e.g., via a WiFi transceiver). In this example, the first universal cassette may detect the location based on the characteristic of local wireless access points.

In other embodiments, the first universal cassette receives location data from the host device via a wired or wireless connection. For example, the host device may provide the first universal cassette with a latitude and longitude, a street address, a branch name or identifier, or any other information that may identify the first universal cassette's location. In some embodiments, the first universal cassette may simply include an identifier of the host device in the first data, which can be used by a central computing system to determine the first universal cassette's location.

As discussed in detail above, the fill level of the first universal cassette may be determined by one or more internal sensors. For example, the fill level may be determined by detecting a number of bills contained within the first universal cassette, by measuring the physical height/depth/thickness of the stack of bills contained within the first universal cassette, or by a combination of these techniques. In any case, the fill level may indicate how full or empty the first universal cassette is (e.g., as a percentage). In some cases, such as for use in an ATM, the first universal cassette may be filled prior to docking to the host device (e.g., by an external refilling station). In other cases, the first universal cassette may be empty at docking, although the first universal cassette may also be at any fill level in between.

In some embodiments, a portion of step 604 is performed by the host device, rather than the first universal cassette, in response to the first universal cassette being installed. For example, the first universal cassette may lack the long-range wireless communication abilities needed to transmit the first data to the central computing system. Accordingly, the host device may relay the fill level and location data to the central computing system. As another example, the first universal cassette may be able to detect a fill level, but not a location, in which case the host device may determine the location data which is then provided to the first universal cassette or the central computing system.

It will be appreciated that additional information may also be included as part of the first data, in addition to the location and fill level information. For example, the first data may also include an updated transaction or event log, as recorded by the first universal cassette. In some embodiments, the first data may also include a battery charge level for the central computing system.

At step 606, the central computing system receives the first data. As mentioned above, the central computing system may be a server or other similar device hosted (e.g., operated and maintained) by the same institution that operates the host devices and/or universal cassettes, or by a third party (e.g., a cloud service). In any case, the central computing system may be an upper-tier or the highest tier in a computing architecture for the institution, capable of performing various functions and storing a wide variety of data. The central computing system may receive the first data via a wired or wireless connection from one or both of the first universal cassette or the host device.

At step 608, the first universal cassette receives or dispenses bills during transactions. More specifically, during a transaction, a user may deposit or withdraw bills via the host device, with the host device storing or retrieving the bills via one or more universal cassettes (e.g., including the first universal cassette). The host device may conduct numerous transactions over a period of time thereby continuously filling and/or emptying the first universal cassette. With an ATM, for example, the first universal cassette may solely or more regularly dispense bills in response to user's requesting withdrawals, thereby gradually emptying over time. In the case of a teller station, the first universal cassette may more regularly receive bills in response to deposits, thereby gradually filling over time.

At step 610, the first universal cassette transmits second data including an updated location and fill level. In many regards, steps 610 is significantly similar to step 604, described above, however the second data may include updated location data and an updated fill level for the first universal cassette. Accordingly, prior to step 610, the first universal cassette may determine a current location and a current fill level, which are then transmitted to the central computing device. In some embodiments, the second data is transmitted at a regular interval, such as every few seconds, every hour, once per day, etc. In other embodiments, the second data is transmitted after each transaction (e.g., at step 608). In yet other embodiments, the second data is transmitted based on a request from the central computing device.

At step 612, the central computing system receives the second data. In some embodiments, after receiving the first or second data, the central computing system may update one or more databases (e.g., generate a transaction or audit log) to record the received data. In other words, the central computing system may maintain records of the fill levels, locations, battery levels, and other parameters of the first universal cassette for future reference and/or processing. As described above, the central computing system may utilize these records to generate various predictions such as how often the first universal cassette will need to be replaced or refilled.

At step 614, the fill level of the first universal cassette is compared to a threshold value, to determine if the first universal cassette should be replaced. In some embodiments, step 614 is performed by the first universal cassette. In such embodiments, a control circuit of the first universal cassette may store a predefined threshold value defining a minimum fill level or a maximum fill level, and the control circuit may compare a current fill level to the threshold to determine if the cassette is full, near full, near empty, or empty. For example, the threshold for the first universal cassette may be 75% full, such that a fill level over 75% would indicate that the first universal cassette should be replaced.

In other embodiments, step 614 is performed by the central computing system. In such embodiments, the central computing system may compare received fill level data (e.g., as part of the second data) to stored threshold values. In still other embodiments, step 614 is performed by the host device. In embodiments where the central computing system or host device perform step 614, process 600 may continue to step 620, described in detail below. Otherwise, process 600 may continue to step 616.

At step 616, the first universal cassette transmits a first notification indicating that the cassette should be replaced, based on the comparison at step 614. In particular, the first universal cassette may transmit the first notification via the wired or wireless connection described above, to the central computing system, notifying the central computing system that the first universal cassette is full or empty. Subsequently, at step 618, the central computing system receives the first notification, and in some cases updates a database to record the first notification and a time of receipt.

At step 620, the central computing system identifies a second, replacement universal cassette. The second universal cassette may be identified based on a number of parameters, such as location (e.g., proximity to the host device containing the first universal cassette), denomination, fill level, etc. However, in many cases the second universal cassette is identified based at least on the second universal cassette's current location and fill level. For example, based on the second data received at step 612, the central computing device may determine a perimeter or distance from the first universal cassette and/or the host device from which to identify eligible replacement cassettes. The second universal cassette may be located within this perimeter or within a specified distance of the first universal cassette to be identified. Additionally the second universal cassette may be configured to store a similar denomination as the first universal cassette, and/or may have an opposing fill level to the first universal cassette. For example, if the first universal cassette is full, the identified replacement cassette would ideally be empty or nearly empty.

In a more detailed example, a geofence may be established around the first universal cassette and/or the host device that specifies that replacement cassettes should be obtained from less than a certain distance from the first universal cassette. For example, it may be determined that the first universal cassette should be replaced with a cassette from the same location or branch (e.g., a bank branch), or from a similar region (e.g., a group of branches). The central computing system may then determine which eligible cassettes have an appropriate fill level. For example, a cassette in a teller station may be full of a certain denomination of bill, and may therefore be an ideal candidate for replacing an empty cassette of the same denomination at an ATM at the same location (e.g., branch) as the teller station.

At step 622, the central computing system transmits a second notification to a remote device, such as user device 334, providing instructions to replace the first cassette with the second cassette. In various embodiments, the central computing system transmits the second notification as a text message, a push notification, a pop-up, an email, a voice call, or by any other suitable method. For example, the central computing system may cause a user device (e.g., a computer at a teller's station) to display a pop-up window identifying the first and second universal cassettes and/or the host device, a location of the first and/or second universal cassettes, a reason for replacing the first universal cassette (e.g., "The first cassette is full and should be replaced"), and any other desired information. The second notification may prompt the user (e.g., a bank employee) to swap the cassettes, and in some cases may identify subsequent location for the first universal cassette after removal (e.g., "Dock the first cassette in teller station A").

The embodiments described herein have been described with reference to drawings. The drawings illustrate certain details of specific embodiments that provide the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory).

Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be provided as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for providing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure may be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A cassette for receiving and dispensing bills, the cassette comprising:
   a sensor structured to detect a location of the cassette; and
   memory having stored thereon instructions that, when executed by one or more processors, cause the one or more processors to:
   transmit the location of the cassette to a remote computing device;
   determine that the location of the cassette has changed; and
   generate an indication that the location of the cassette has changed;
   wherein the indication is an audit log, and the instructions further cause the one or more processors to generate the audit log by:
   determining that a user has manipulated the cassette by accessing, moving, or servicing the cassette; and
   storing, in a database, a record comprising an identification of the user, a time and date associated with the manipulation of the cassette, and an indication of how the cassette was manipulated.

2. The cassette of claim 1, further comprising a wireless transceiver configured to transmit data to the remote computing device and receive data from the remote computing device via a wireless network.

3. The cassette of claim 2, wherein the wireless transceiver is one of a WiFi transceiver or a Bluetooth transceiver.

4. The cassette of claim 1, wherein the sensor is a global positioning system (GPS) transceiver.

5. The cassette of claim 1, further comprising a radio-frequency identification (RFID) transmitter, wherein an RFID reader positioned within a host device is configured to determine one or more parameters of the cassette based on an RFID code.

6. The cassette of claim 1, wherein the cassette is configured for use in both an ATM and a teller station.

7. The cassette of claim 1, further comprising a rechargeable battery, wherein the instructions further cause the one or more processors to transmit a battery level of the rechargeable battery to the remote computing device.

8. The cassette of claim 1, wherein the sensor is a first sensor, and further comprising an encoded identifier, wherein a second sensor positioned within a host device is configured to determine one or more parameters of the cassette by scanning the encoded identifier.

9. The cassette of claim 1, wherein the instructions further cause the one or more processors to store, in a database, the location of the cassette.

10. A method comprising:
    receiving, by a first computing device from a first cassette, an indication of a location of the first cassette;
    identifying, by the first computing device, a second cassette based on the location of the first cassette, the second cassette being within a predetermined geographical area with respect to the first cassette;
    transmitting, by the first computing device and to a second computing device, a notification identifying the second cassette;
    generating, by the first computing device, a log indicating a time and a description for one or more events associated with the first cassette, wherein the one or more events comprise a user accessing, moving, or servicing the first cassette; and storing, in a database, a record comprising an identification of the user, an indication of the one or more events associated with the first cassette, and the time and a date associated with the one or more events associated with the first cassette.

11. The method of claim 10, wherein the first computing device and the second computing device are configured to transmit and receive data via a wireless network.

12. The method of claim 10, wherein the location of the first cassette is determined based on global positioning system (GPS) data received by a GPS transceiver of the first cassette.

13. The method of claim 10, wherein the first cassette and the second cassette are configured for use in both an ATM and a teller station.

14. The method of claim 10, further comprising receiving, by the first computing device, a battery level of a rechargeable battery of the first cassette.

15. The method of claim 10, further comprising detecting, by the first computing device, the first cassette after the first cassette is docked in a host device, wherein detecting the first cassette further includes determining one or more parameters of the first cassette.

16. The method of claim 15, wherein the first cassette is detected based on a radio-frequency identification (RFID) tag associated with the first cassette.

17. The method of claim 15, wherein the first cassette is detected by capturing image data of a QR code or a bar code positioned on an exterior surface of the first cassette.

18. One or more memory devices having instructions stored thereon that, when executed by one or more processors, cause the one or more processors to perform operations comprising:

receiving, from a control circuit of a first universal cassette, an indication of a location of the first universal cassette;

identifying, based on the location, a second universal cassette for replacing the first universal cassette;

transmitting, to a remote computing device, a notification identifying the second universal cassette;

generating a log indicating a time and a description for one or more events associated with the first universal cassette, wherein the one or more events comprise a user accessing, moving, or servicing the first universal cassette; and storing, in a database, a record comprising an identification of the user, an indication of the one or more events associated with the first universal cassette, and the time and a date associated with the one or more events associated with the first universal cassette.

* * * * *